(12) United States Patent
Mason et al.

(10) Patent No.: US 7,091,851 B2
(45) Date of Patent: *Aug. 15, 2006

(54) GEOLOCATION SYSTEM-ENABLED SPEAKER-MICROPHONE ACCESSORY FOR RADIO COMMUNICATION DEVICES

(75) Inventors: Charles Mason, Milpitas, CA (US); Raymond Burkley, Milpitas, CA (US); John Cronin, Milpitas, CA (US); Alan Czeszynski, Milpitas, CA (US)

(73) Assignee: Tri-Sentinel, Inc., Milpitas, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 10/745,345

(22) Filed: Dec. 23, 2003

(65) Prior Publication Data

US 2004/0192353 A1 Sep. 30, 2004

Related U.S. Application Data

(63) Continuation-in-part of application No. 10/613,489, filed on Jul. 2, 2003.

(60) Provisional application No. 60/436,373, filed on Dec. 23, 2002, provisional application No. 60/404,055, filed on Aug. 15, 2002, provisional application No. 60/395,755, filed on Jul. 12, 2002, provisional application No. 60/393,693, filed on Jul. 2, 2002.

(51) Int. Cl.
*G08B 1/08* (2006.01)
*H04M 11/04* (2006.01)

(52) U.S. Cl. ............................. 340/539.13; 340/539.11; 340/539.18; 340/825.36; 340/825.49; 455/404.2; 455/456.1; 455/457

(58) Field of Classification Search ........... 340/539.18, 340/539.11, 539.13; 455/404.2
See application file for complete search history.

(56) References Cited

U.S. PATENT DOCUMENTS

| | | | | |
|---|---|---|---|---|
| 5,946,618 A | * | 8/1999 | Agre et al. ................. | 455/428 |
| 6,169,497 B1 | * | 1/2001 | Robert ....................... | 340/988 |
| 6,243,039 B1 | * | 6/2001 | Elliot ......................... | 342/457 |
| 6,653,937 B1 | * | 11/2003 | Nelson et al. ........... | 340/539.1 |
| 2001/0048364 A1 | * | 12/2001 | Kalthoff et al. .......... | 340/573.1 |

* cited by examiner

*Primary Examiner*—Donnie L. Crosland
(74) *Attorney, Agent, or Firm*—Courtney Staniford & Gregory LLP

(57) ABSTRACT

A communication accessory device is provided for use with a portable communication device like a radio. The accessory device, which couples to the standard communication device, includes a network system that automatically assembles a wireless network among other similarly equipped portable communication devices and control devices in an incident area and automatically assigns a unique identification to each portable communication device. The accessory device also includes a communication system that receives and transmits voice and data communications over the wireless network using at least one of High Frequency (HF), Very High Frequency (VHF), Super High Frequency (SHF), Ultra High Frequency (UHF)/microwave, public safety band, cellular, satellite, and Public Switched Telephone Network (PSTN) communications. The accessory device further includes a positioning system that automatically and periodically determines a position of the device and automatically transfers the position to control devices via the wireless network.

20 Claims, 11 Drawing Sheets

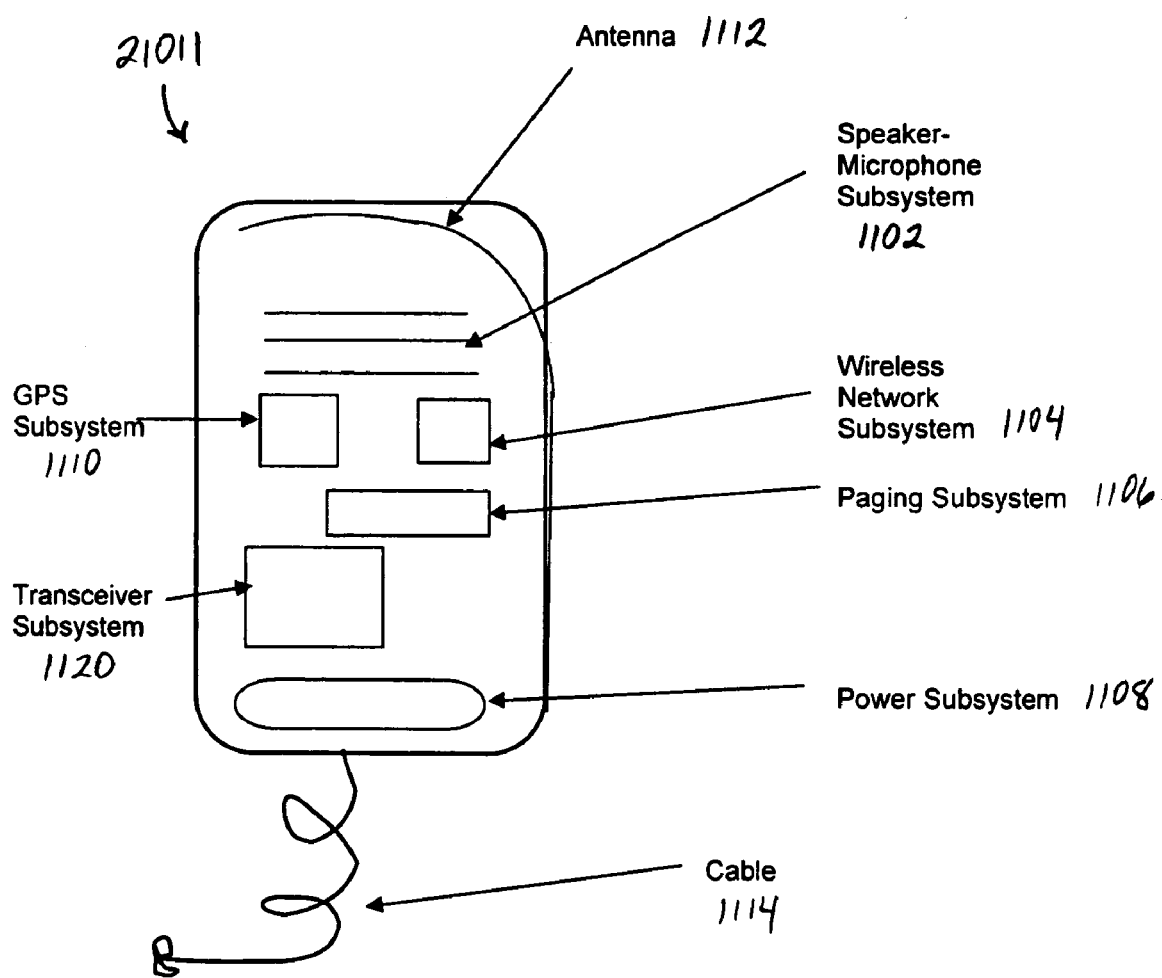

GEOLOCATION SYSTEM-ENABLED SPEAKER-MICROPHONE ACCESSORY FOR RADIO COMMUNICATION DEVICES

RELATED APPLICATIONS

This application claims priority from U.S. Patent Application No. 60/436,373, filed Dec. 23, 2002. This application also claims priority from and is a continuation-in-part application of U.S. patent application Ser. No. 10/613,489, filed Jul. 2, 2003, which claims priority from U.S. Patent Application No. 60/393,693, filed Jul. 2, 2002, U.S. Patent Application No. 60/395,755, filed Jul. 12, 2002, and U.S. Patent Application No. 60/404,055, filed Aug. 15, 2002.

TECHNICAL FIELD

The disclosed embodiments relate to wireless devices for automated individual communication, tracking and accountability.

BACKGROUND

First responders are organizations and personnel that provide law enforcement, safety and protection services to the public. The first responders include law enforcement officers like police, sheriff, highway patrol, detectives, special law enforcement, FBI, DEA, military personnel, border patrol, and others. First responders also include fire and safety personnel, for example, firefighters, emergency medical services personnel, Red Cross personnel, and other emergency workers.

The communications systems and associated command and control capabilities used by first responders in responding to an incident or other emergency are typically limited to agency-unique communication frequencies and procedures. As a result, the various different groups of personnel that respond to emergency incidents (police and firefighters, for example) are unable to communicate with each other. When different groups of first responders need to communicate with each other at an incident scene they typically use "runners" to relay information, or each group just performs their respective tasks and operates without any type of unified communication or operation. In some cases, inter-agency communications occur by relaying information through the respective dispatch centers. However, this is a very slow and inefficient way of communicating. The lack of inter-operable communications between on-scene agencies can result in ineffective coordination, often with tragic results.

Further to the very limited communications capability, adequate situational awareness is also lacking among the first responder personnel and among various first responder teams because there is no way to know the location of the various first responders at the incident scene without constant monitoring of voice communications. However, the lack of voice communications among the different groups of first responders means that the only situational awareness even available is that of the members of the same agency.

Integral to the lack of situational awareness at an incident site is the lack of an accurate system for maintaining accountability of the first responders at an incident site. The typical methods used to maintain accountability of first response personnel are manual methods. In each of these manual methods, the principal is to use some physical means of identifying whether a responder is present at the incident scene, and in some cases to identify where the responder is assigned during the emergency. Because these methods are manual, they do not provide a way to accurately account for all first responder personnel at an incident site, nor do they provide ways to dynamically track the actual location or movement of first responder personnel around the incident site as the emergency unfolds. Consequently, the incident command and control personnel (also referred to as Incident Command) do not have detailed information on the location of the first responders and can lose accountability of first responders. As an example, the lack of intelligence at incident sites has resulted in the loss of numerous firefighter personnel (over 100 per year in every day fires) as well the injury of many others (many hundreds) in fires because the incident commander was unaware of the dangerous circumstances or lost accountability of individual firefighters.

The lack of adequate intelligence information and inter-agency communications at incident sites results in incident commanders and first responder personnel that lack the detailed information and situational awareness of the incident scene to effectively respond to an emergency. The cascading effect typically results in slower response times to emergencies and a much higher level of risk for the first responders and incident victims. Consequently, there is a need among first responders to have accountability of and interoperable communications among all responders at an incident site as well as a high level of situational awareness for the first responders in order to provide greater safety and more efficiency in the use of the resources at the incident scene.

BRIEF DESCRIPTION OF THE FIGURES

FIG. 11 is a block diagram of the SMA, under an alternative embodiment.

In the drawings, the same reference numbers identify identical or substantially similar elements or acts.

DETAILED DESCRIPTION

Figure 1:
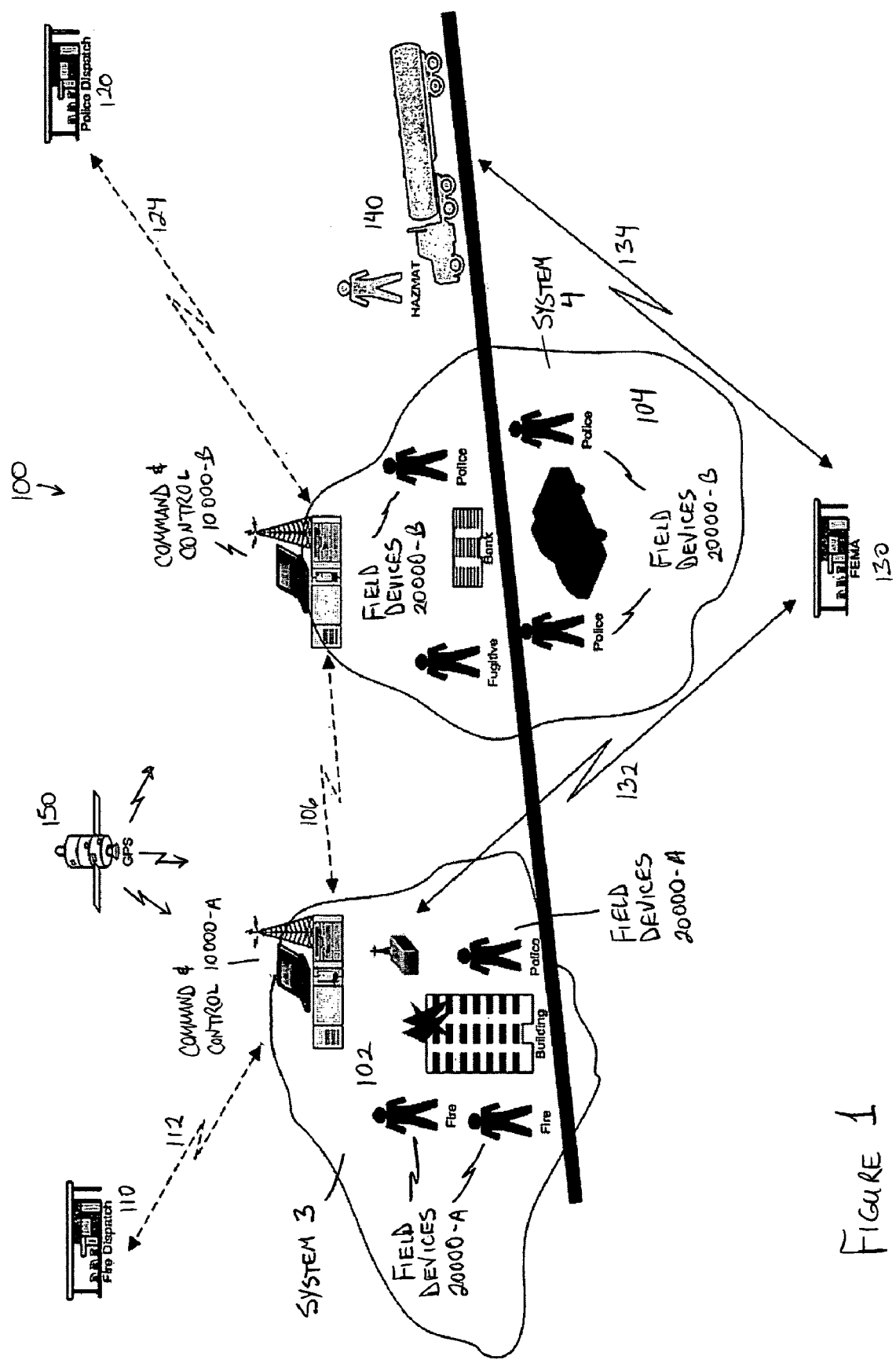
FIG. 1 is a block diagram of an environment including First Responder Communications Systems (FRCS), under an embodiment.
Figure 2:
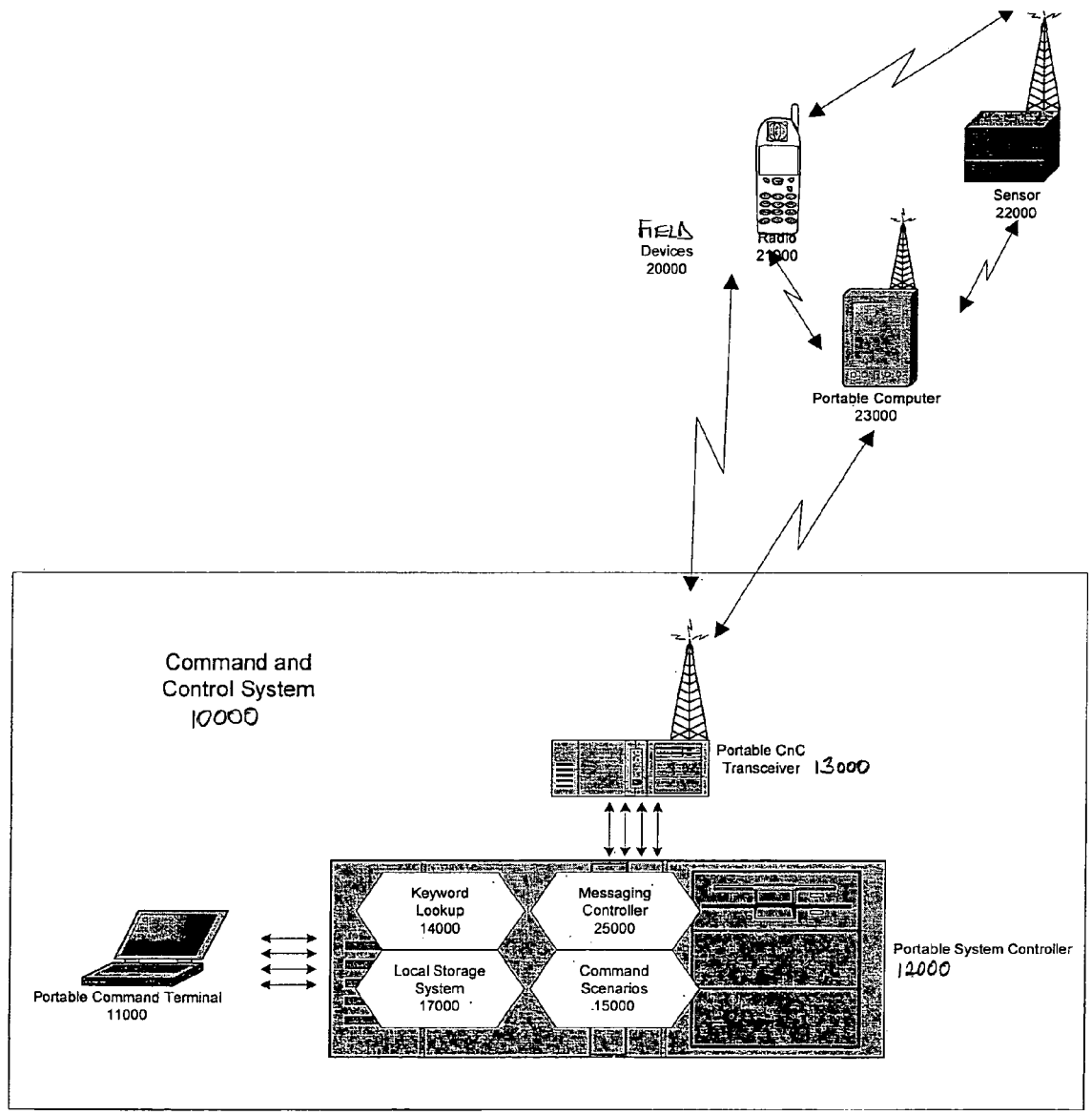
FIG. 2 is a block diagram showing components of the first responder communications system, under the embodiment of FIG. 1.

FIG. 1 is a block diagram of an environment 100 including a First Responder Communications System (FRCS), under an embodiment. FIG. 2 is a block diagram showing components of the first responder communications system, under the embodiment of FIG. 1. The FRCS, also referred to as the Automated Incident Control System (AICS) or Mobile Incident Control System (MICS), provides inter-agency and intra-agency communications among first responders including fire, police, border patrol, emergency medical service, safety, and/or other agencies. The FRCS also supports communication among multiple on-scene agencies and various command and control personnel, also referred to as Incident Command, and increases situational awareness by automatically providing position information as well as other sensor information.

Components of the FRCS of an embodiment integrate multiple communications channels including, but not limited to, High Frequency (HF), Very High Frequency (VHF), Super High Frequency (SHF), Ultra High Frequency (UHF)/ microwave, public safety band, cellular, satellite, and Public Switched Telephone Network (PSTN). The FRCS also provides position and time information via Global Positioning System (GPS) and/or other positioning systems, and data from deployed and/or personal sensors to provide enhanced geographical location or geolocation, communications, command and control capabilities to the first responders and incident command.

The various functions provided by the FRCS of an embodiment can be provided by any number or combination of components of the FRCS system, and is not limited to being provided as described below. Further, the routing of information/data through the FRCS system can be via any number or combination of components of the FRCS system, and is not limited to the routings described below. Likewise, the processing of information/data by the FRCS system can be performed by any number or distributed among any combination of components of the FRCS system, and is not limited to the processing locations described below.

In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

The FRCS of an embodiment, with reference to FIG. 1 and FIG. 2, includes a command and control system 10000 and field devices 20000, but is not so limited. Each first responder is equipped with a field device 20000 that includes a portable or mobile radio 21000 operating on at least one interoperable radio frequency, as described in detail below. The portable or mobile radio 21000, also referred to as a responder radio 21000, includes handheld radios, but is not so limited. As each first responder, also referred to as a responder or responder personnel, arrives on scene they can immediately communicate with each other and with the on-scene incident commander via the field devices 20000 and components of the command and control system 10000. As additional responders arrive or are dispatched to the scene, they become part of the on-scene commander's team, with instant communications in a self-configuring network formed by the command and control system 10000 and the field devices 20000, as described in detail below.

Components of the FRCS also support incident commanders organizing teams into specific subgroup teams for purposes of communicating about specific team tasks. As an example, fire fighters entering a building can communicate and coordinate with police and hazardous material (hazmat) teams outside the building using specific communication channels set automatically by the commander. However, all on-scene personnel are able to communicate with each other, as necessary.

The radios 21000 of an embodiment operate using both line of sight communications (VHF and/or UHF) and ground wave short wave communications (HF), to name a few, thereby increasing the reliability of in-building communications within the team and to the incident commander. The radios automatically select communication bands/frequencies using signal information of the bands so that the best signal band is always being used. Each of the radios 21000 includes at least one position/location system that uses some form of GPS technology 150. Components of the radios 21000 including the position system transfer or transmit a position of each individual first responder to the commander. In one embodiment, the location is transmitted as data simultaneously with each voice communication from the responder. The position is also transmitted periodically via data-only transmissions using a pre-specified period, but is not so limited.

The radios 21000 also include or are coupled to at least one sensor 22000. The sensors 22000 provide additional data to incident commanders about the first responder and/or the environment. As an example, the sensors 22000 can provide biometric information on the health/vital signs of the first responders as well as providing alerts regarding a fire (using heat and/or smoke sensors) and/or gunshots (using frequency sensors). Additional robot sensor devices (not shown) that communicate among the radios and the incident commander can be dropped or placed on the scene as desired.

The command and control system 10000 of the FRCS of an embodiment is a separate unit or subsystem, but is not so limited. The command and control system 10000 is portable and can be installed in vehicles so that whoever first arrives at an incident scene can assume the oversight command and control function. The command and control system 10000 includes a computer system or portable system controller 12000, a multi-band radio transceiver 13000, and a portable command terminal 11000, but is not so limited.

The portable command terminal 11000 can be an existing public safety terminal like ones in use for mobile data communications and display. The portable command terminals 11000 of various alternative embodiments can be a rugged portable computer tablet or laptop computer.

The portable system controller 12000 enables the self-configuring network among the command and control system 10000 and the field devices 20000 as well as the allocation of groups or teams. Further, the portable system controller 12000 controls the radio transceiver 13000. The radio transceiver 13000 also includes additional communication frequencies known in the art as well as cellular telephone capabilities. The portable system controller 12000 includes a number of command and control functions, some of which include keyword recognition that functions to decode police and fire ten-code numbers in near real-time and automatically recognize the level of threat or seriousness of a situation.

Additionally, the portable system controller 12000 includes numerous knowledge-based scenarios in a database. These knowledge-based scenarios are used by the command and control system 10000 to generate predictions as to the likely progression of an incident, generate and/or activate situation checklists along with lists of needed resources, and provide the predictions and checklists to key first responder personnel in near real-time. As such, the command and control system 10000 enables efficient and rapid deployment of resources at an incident site. These functions also enable the on-scene command personnel to be highly effective by taking advantage of these scenarios and past lessons learned from the knowledge database.

As an example in operation, and with reference to FIG. 1, each first responder carries a field device 20000 that includes at least one radio 21000 operating on an interoperable radio frequency at the incident area 102 and 104. Two incident areas 102 and 104 are depicted for this example in which FRCS system 3 and FRCS system 4 operate, respectively, but the FRCS is not limited to operation in two incident areas.

As each first responder individual arrives on scene they can immediately and automatically communicate with each other and with the on-scene incident commander via their field devices 20000 and the command and control system 10000. As additional responders arrive or are dispatched to the scene, they become part of the on scene commander's team, with instant communications in a self-configuring network 100. The responder radios 21000 operate on HF/VHF/UHF interoperable radio frequencies, but can also support other communication mediums and protocols. The responder radios 21000 can simultaneously use more than one communication band at a time.

Additionally, communications can be established between various components of each of FRCS system 3 and FRCS system 4 and various other organizations and/or locations. For example, the command and control system 10000-A of FRCS system 3 can establish communications with fire dispatcher 110 via coupling 112 and the Federal Emergency Management Agency (FEMA) 130 via coupling 132. Likewise, the command and control system 10000-B of FRCS system 4 can establish communications with the command and control system 10000-A of system 3 via coupling 106 and the police dispatcher 120 via coupling 124. As such, members of multiple response agencies (police and fire in this example) at the same or multiple incident sites are in communication with one another. The couplings or communication paths between the various components of the network 100 include wireless connections, wired connections, and hybrid wireless/wired connections, but are not so limited.

The responder radio 21000 includes a Multi-Band Intra-Team Radio (MBITR) platform. Further, the responder radios 21000 support peer-to-peer ad-hoc wireless networking, with multi-hop routing of data packets among the nodes, where each radio 21000 forms a node. Using this approach, routing tables are assembled at the receiving end (command and control system 10000) and propagated back though the nodes (field devices 20000). Each responder is tracked by a unique global identifier such as a Media Access Control (MAC) address provided the by an 802.11x beaconing function within the peer-to-peer network.

The responder radios 21000 use a Voice over Internet Protocol (VoIP) local area. network (LAN) for data and audio communications. Voice communications from the responder radio 21000 can pass to components of the command and control system 10000, like the portable system controller 12000, and be converted into text data for retransmission to the handheld computers 23000. Likewise, output data from the sensors 22000 can register as an alert on the responder radios 21000.

The responder radios 21000 provide location information using enhanced geo-location technology 150 so that each responder's location is transmitted to the incident commander at regular intervals via components of the command and control system 10000. The geo-location system includes a Global Positioning System (GPS) receiver, but is not so limited. Alternative embodiments of the responder radios can provide geo-location information using at least one of the following technologies alone and/or in combination with the GPS: acoustic ranging and triangulation; locally generated RF signals external to an incident structure; external RF infrastructure (e.g., frequency modulation (FM) broadcast signals and/or television signals that enable line of bearing triangulation into buildings for indoor positioning where GPS signals are unreliable); wearable devices on the responder's person, clothes, and equipment, for example micro-electromechanical system (MEMS) accelerometers/gyroscopes, that provide additional geo-location input and positioning data; ultra-wideband (UWB) RF microwave/millimeter wave systems that automatically generate and transmit regular position and position update messages; and barometric pressure devices.

The geo-location system, which is a component of and/or coupled to the field devices 20000, automatically generates and transmits regular position and position update messages to components of the command and control system 10000, for example the portable system controller 12000. The geo-location data is also transmitted to the portable system controller 12000 each time the transmitter of a responder radio is manually keyed. The responder radios 21000 also include additional location sensors, sensors that use acoustic and RF technologies for example, to increase the reliability of position reporting for in-building communications. The command and control system 10000 includes a mapping system that presents the geographic location of each first responder in the network to the incident commander on a two- or three-dimensional map, as described below.

The responder radios 21000 of an embodiment automatically forward select data to components of the command and control system 10000. In one embodiment, data is forwarded on an exception bases where, for example, the data is associated with pre-specified events like the presence of particular contaminants or recognition of a suspect sound/frequency like a gun shot. In the responder radio 21000 of this embodiment, a knowledge base is included in or coupled to the responder radio and/or the sensor. The knowledge base includes information of criteria triggers for the pre-specified events of interest. Using the criteria trigger, when the value of an item being monitored reaches a pre-specified threshold, the data associated with that item is forwarded to the command and control system 10000 and presented as a visual or audible warning and also brought to the first responder's attention using a synthesized voice or a display of the responder radio.

In another embodiment, the data is to be continuously monitored and is therefore continuously forwarded from the responder radio 21000/sensor 22000. Examples of continuously monitored data include link margin parameters, first responder biometric information like respiration, and/or first responder location. The knowledge base used to evaluate the data is the knowledge base of the command and control system 10000. The knowledge base is used to generate alerts/notifications that a data value/parameter has reached/exceeded a pre-specified threshold. Further, the command and control system 10000 of this passive monitoring embodiment logs the received data and interprets the data for trend analysis to support predictive action instead of reactive action.

Figure 3:
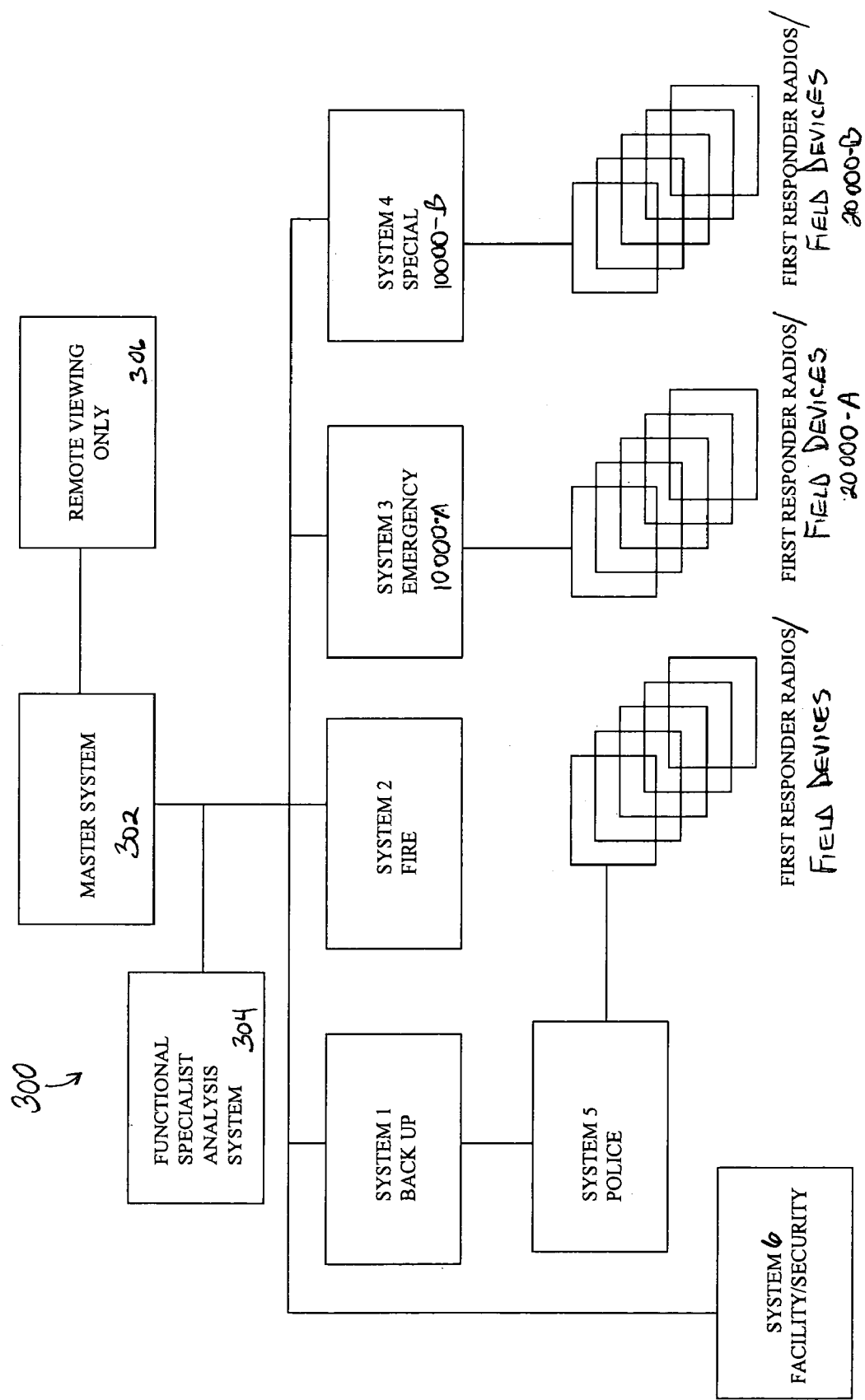
FIG. 3 is a block diagram of a communications network established among multiple first responder communications systems, under an alternative embodiment of FIG. 1.

As a further example of the network capabilities of the FRCS, FIG. 3 is a block diagram of a communications network 300 established among multiple first responder communications systems 1–6, under an alternative embodiment of FIG. 1. This example builds on the example described above with reference to FIG. 1 in that FRCS system 3 and FRCS system 4 are now networked with additional FRCS systems 1, 2, 5, and 6. In addition, the FRCS network is coupled among-systems and/or components that include a master system 302, a functional specialist analysis system 304, and a remote viewing system 306.

As an example, the master system can gather information of a number of incident scenes from the FRCS network for presentation to high-level officials and/or decision makers. The functional specialist analysis system 304 can support various levels of analysis of information gathered from the incident scenes, as appropriate. The remote viewing system 306 supports the graphical presentation of incident information at any number of viewing sites. There are no geographical limitations on the locations or proximities of the components of the FRCS network 300, and the couplings or communication paths between the various components of the network 300 include wireless connections, wired connections, and hybrid wireless/wired connections, but are not so limited.

Figure 4:
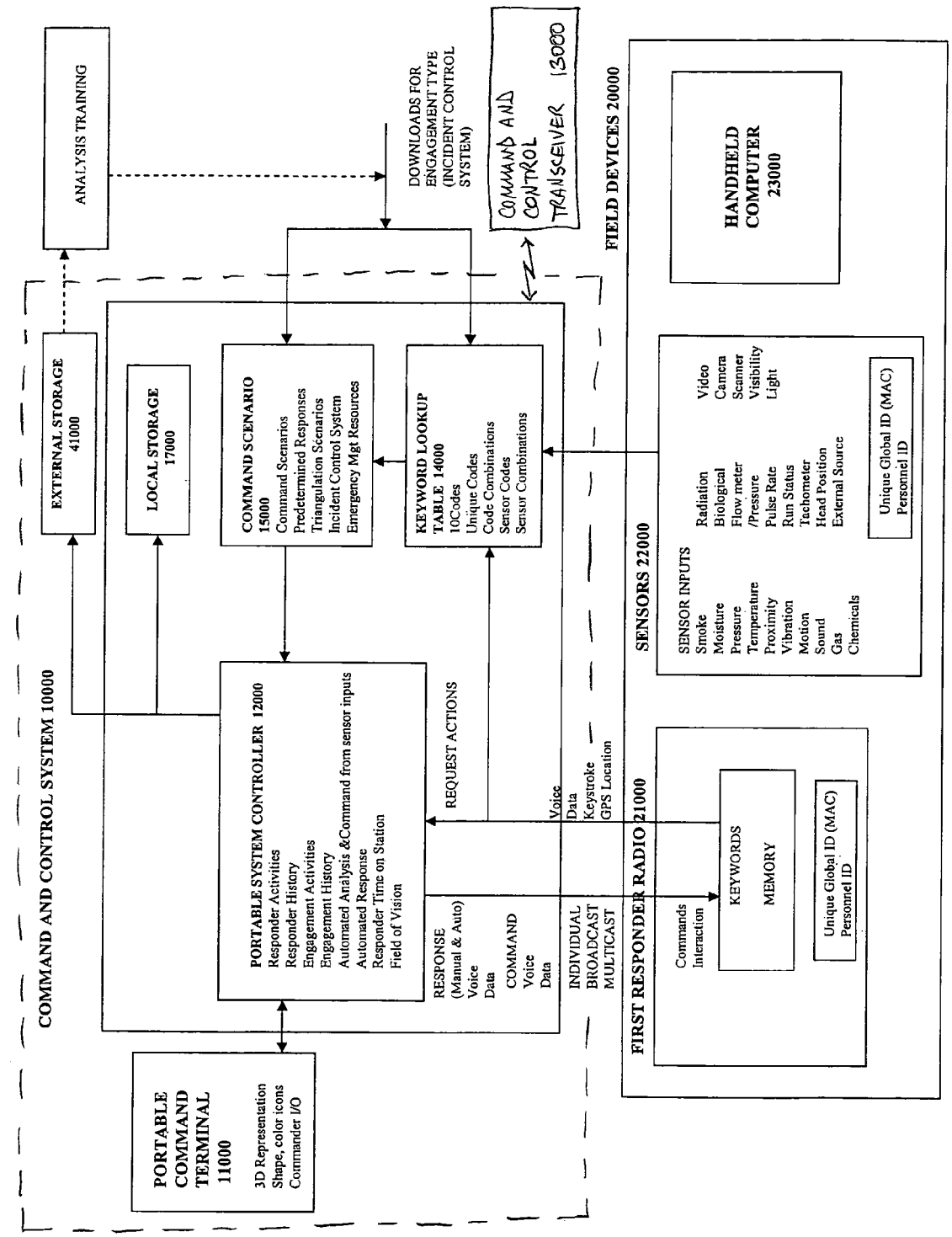
FIG. 4 is a block diagram showing components of the command and control system and field devices of the FRCS, under the embodiment of FIG. 2.

FIG. 4 is a block diagram showing components of the command and control system 10000 and field devices 20000 of the FRCS, under the embodiment of FIG. 2. As described with reference to FIG. 1, the FRCS includes a command and control system 10000 coupled among numerous field devices 20000. The command and control system 10000 provides a three-dimensional graphical representation of an incident, including locations of structures, assets, and personnel, along with a centralized command, control, and communications interactive environment.

The command and control system 10000 includes a portable system controller 12000 coupled among at least one of a portable command terminal 11000, keyword lookup engines, tables, and/or systems 14000, command scenario systems or databases 15000, and local storage devices 17000. Furthermore, the command and control system 10000 of an embodiment is coupled among at least one command and control transceiver 13000. The command and control system can also couple to any number of external devices and systems known in the art, for example, external storage devices 41000 and external systems like expert systems and other analytical systems that perform near real-time and post-event analysis of data collected from/ during an incident along with systems that generate training scenarios.

The field devices 20000 of the FRCS include, but are not limited to, first responder radios 21000, sensors 22000, and other portable processor-based devices 23000, for example personal digital assistants (PDAs), personal computers, cellular telephones, mobile electronic devices, mobile communication devices, and other portable computing devices. Different ones of the field devices 20000 couple in any number of combinations with various components of the command and control system 10000 to provide for information exchange through the FRCS.

The communication path between the components of the FRCS including the field devices 20000 and the command and control system 10000 includes wireless connections, wired connections, and hybrid wireless/wired connections. The communication path also includes couplings or connections to or through networks including local area networks (LANs), metropolitan area networks (MANs), wide area networks (WANs), proprietary networks, interoffice or back-end networks, and the Internet. Furthermore, the communication path includes removable fixed mediums like floppy disks, hard disk drives, and CD-ROM disks, as well as telephone lines, buses, and electronic mail messages, but is not so limited.

The communication protocols in use between the components of the FRCS include forward error correction (FEC) and end of message information, but are not so limited. Additional functions including authentication, key authentication, and FEC encoder functionality can also be included.

Components of the command and control system 10000 and the field devices 20000 form a self-configuring network, but are not so limited. In so doing, a portable command terminal 11000 belonging to the on-scene commander in charge of the response team is designated as the master or primary terminal, while all other command terminals 11000 at the incident site are slave terminals to the master terminal. This network configuration allows the response effort to be directed and coordinated by a single authority while allowing the slave terminals to monitor and control specific detailed activities in the engagement area under the direction of the master terminal/commander.

The FRCS uses a protocol to dynamically determine/ assign master and slave terminals. The slave terminals are ranked, with the highest ranking terminal becoming a backup to the master terminal. As the master terminal includes all situational information, data, and logs associated with an incident, the protocol backs up information of the master terminal in one or more backup terminals, but is not so limited. A display on the terminal indicates whether the terminal is a master or slave terminal. The protocol also accounts for the seniority of the commander to whom it is assigned as well as the agency and type of situation. The protocol is executed each time a new terminal joins the system. As such, a master terminal can be downgraded by the presence of another command terminal belonging to a more senior authority.

Components of the command and control system form monitoring groups for each responder radio at an incident site. As such, the responder radios each store a list of other transmitters from which communications are monitored. When a transmitter is on the monitoring list of a responder radio, components of the responder radio forward transmissions from that transmitter to the speaker/display of the responder radio. The operator of a portable command terminal, for example, specifies one or more monitoring groups along with a monitoring radius for each radio/group, but is not so limited. Further, the monitoring radius can be adjusted at the responder radio. As responder radios enter/leave the proximity of a monitoring group, the command terminal automatically updates the monitoring list of the affected responder radios of the group.

Figure 5:
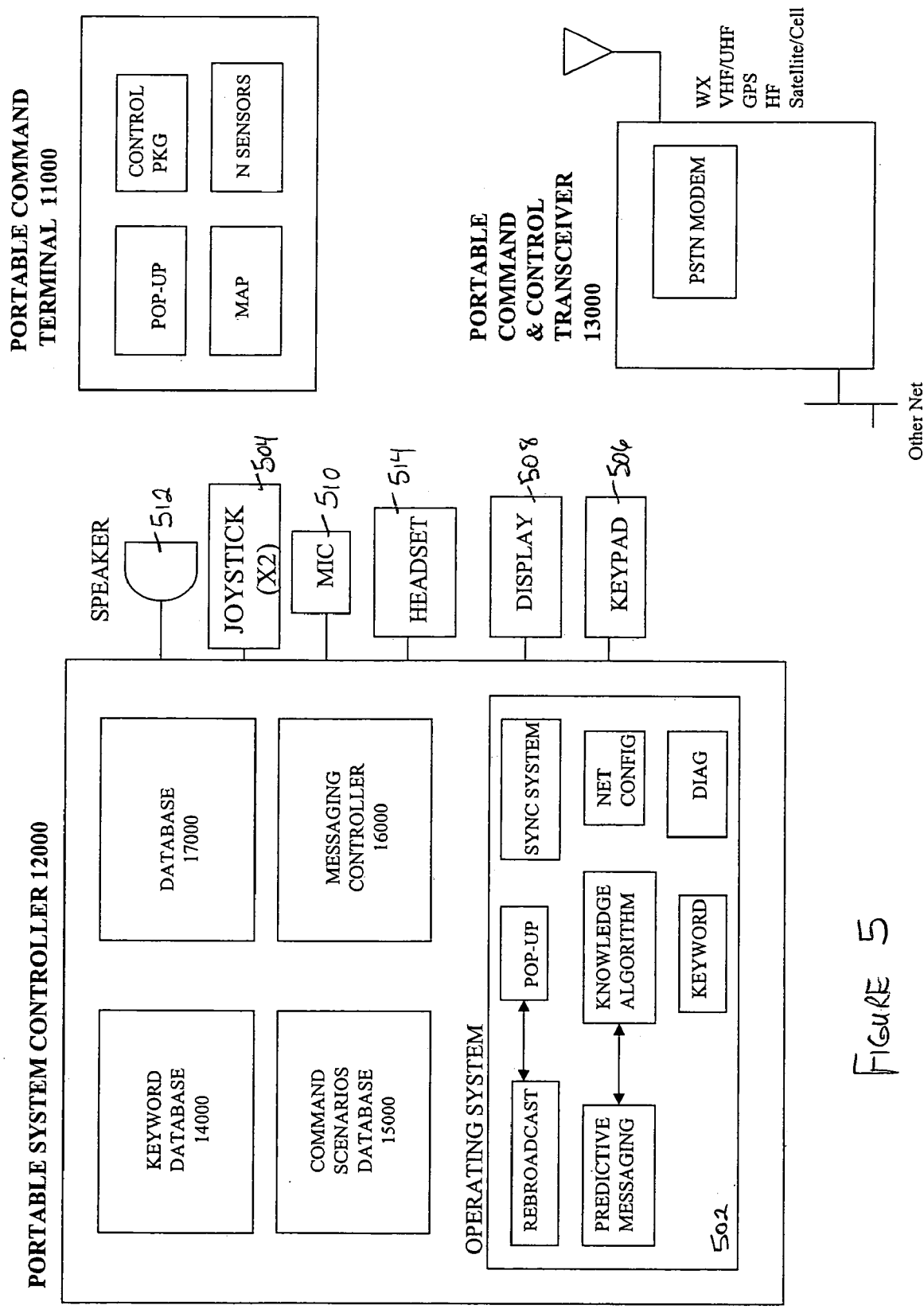
FIG. 5 is a block diagram of the components of the command and control system of the first responder communications system, under the embodiment of FIG. 4.

FIG. 5 is a block diagram of the components of the command and control system of the first responder communications system, including the portable system controller 12000, the portable command terminal 11000, and the command and control transceiver or radio 13000, under the embodiment of FIG. 4. Each of these components is described in detail below.

The portable system controller 12000 includes but is not limited to a processor (not shown) running under the control of one or more routines, programs, or algorithms. The portable system controller 12000 couples among an operating system 502 and at least one of a keyword database, system, or lookup table 14000, a command scenario system or database 15000, a database or local storage 17000, and a messaging system or controller 16000. Additionally, the portable system controller 12000 is coupled to any number of external devices known in the art for coupling to processor-based systems, including joysticks 504, keypads and data entry devices 506, displays 508, microphones 510, speakers 512, and headsets 514.

The keyword database 14000 receives information in the form of messages from the responder radios and the sensors. Upon receipt of the messages, the keyword database 14000 generates a voice or text translation, as appropriate. The keyword database 14000 then analyzes the contents of each message by comparing the received information with predetermined combinations of codes (ten codes, custom or unique codes, etc.) and other information of interest to the incident commander. The results (e.g., matches) of the lookup operations are transferred to the command scenario database 15000, but are not so limited. The contents of the keyword database 14000 are periodically updated.

The command scenario database 15000, also referred to as the scenario database 15000, is populated using standard operating procedures of the various responder agencies along with information of the Incident Control System (ICS), the Emergency Management Resources, and the analysis of post-incident reviews. As such, the scenario database 15000 includes command scenarios and predetermined responses that support providing advice to the incident commander regarding possible actions to be taken during an incident response. Information of the command scenarios provides the benefit of the accumulated collective knowledge and past experience to enhance the controls for future engagements. The results of the lookup operations are received in the scenario database 15000 where each result is compared to rules for individual or collective actions.

The local database 17000 stores a log of the interactions among the portable command terminal 11000, responder radios 21000, and sensors 22000. The local database 17000, therefore, supports post-incident reviews, analysis, and auditing of the response. Further, training scenarios are built using the information of the local database 17000.

The portable command terminal 11000, also referred to as the control console 11000, provides near real-time visualization of an incident using a three-dimensional graphical representation of the engagement area. Shaped and colored icons provide ease of recognition and interpretation of responders, assets, and status of individuals and assets. The icons display the location of responders/assets and allow for tracking of radio positions (and therefore responders), assets, and sensors. The control console 11000 is based on a graphical user interface (GUI) for ease of situational assessment, interaction, and consequent situational awareness. Pop-ups are used in an embodiment to display near-real time conditional changes of interest to the incident commander or that require action, significantly enhancing attention to detail and facilitating the automation of tasks. Alternative embodiments can use any number of display technologies to display the control information. Audible sounds can be used to indicate warnings, alone or in combination with pop-up graphics to alert the incident commander of significant or near critical situations.

The control console 11000 includes at least one processor (not shown) coupled among an operating system (not shown) and at least one of a control package that supports various types of incidents, sensors, pop-ups, and maps, but is not so limited. Local command and control packages support numerous applications to provide the control and coordination required for the corresponding application. The control console 11000 provides current information relating to each responder radio 21000 and enables the operator to view the location and activity of each first responder with a responder radio 21000 or field device 20000. The control console 11000 also supports communications with the responder radios 21000 via voice, short messaging including short messaging service (SMS) and other text messaging services, non-voice signaling, and light-emitting diode (LED) signaling. The control console 11000 is hosted on a portable personal computer or other processor-based device and provides full support of all technologies used in the responder radios 21000.

The control console 11000 provides the local incident commander with information concerning the personnel and activities in an engagement, and the ability to direct actions and activities and to assess the situation in order to bring it to a successful conclusion. The control consoles 11000, using various combinations of command and control system 10000 components, locate a position of each of the responder radios and track the radio movements using the appropriate location technology, for example, GPS, radio frequency (RF) identification/direction finding (ID/DF), infrared (IR) techniques, and/or numerous signaling techniques known in the art.

Further, the control consoles support interactive communications with the responder radios via one or more of the following technologies: voice, short messaging, non-voice RF signal, LCD indicator or sound, depending on the particular situation. The control units provide both selective and broadcast communications capability to the responder radios. The control software enables the operator to automatically overlay the remote positions on an area map appropriate to the incident, thereby enabling the operator to direct the actions and activities of the first responder personnel. This capability can be tailored for the different situations encountered by the various types of first responders (police, border patrol, firemen, etc.) both in terms of the type of technologies available and the type of direction and control that is required for the situation.

As in the case of the hardware, the software of the control console 11000 is modular and, as such, provides flexibility and capability in applications and incidents. The control consoles 11000 can receive and store various types of software and periodic updates to maintain flexibility and maximum capability.

The portable command and control transceiver or radio 13000, also referred to as the command radio 13000, includes communication circuitry, antennas, and/or modems to support communication via any number of protocols and frequency bands known in the art. For example, the command radio 1300 of an embodiment supports HF, VHF, UHF/microwave, cellular, satellite, and PSTN communications using both analog and digital protocols. The command radio 13000 supports individual, group (multicast), and broadcast communications with the responder radios 21000.

The command radio 13000 transmits and receives on a common frequency for all responders in order to provide an integrated response by all response agencies. The command radio 13000 of an embodiment uses the National Weather Service channel link for selective responder alerting. Low power HF provides seamless backup of VHF/UHF communications using the ground wave. The command radio 13000 also communicates via the transfer of packet data. In addition, the command radio 13000 communicates using voice and data messages.

Figure 6:
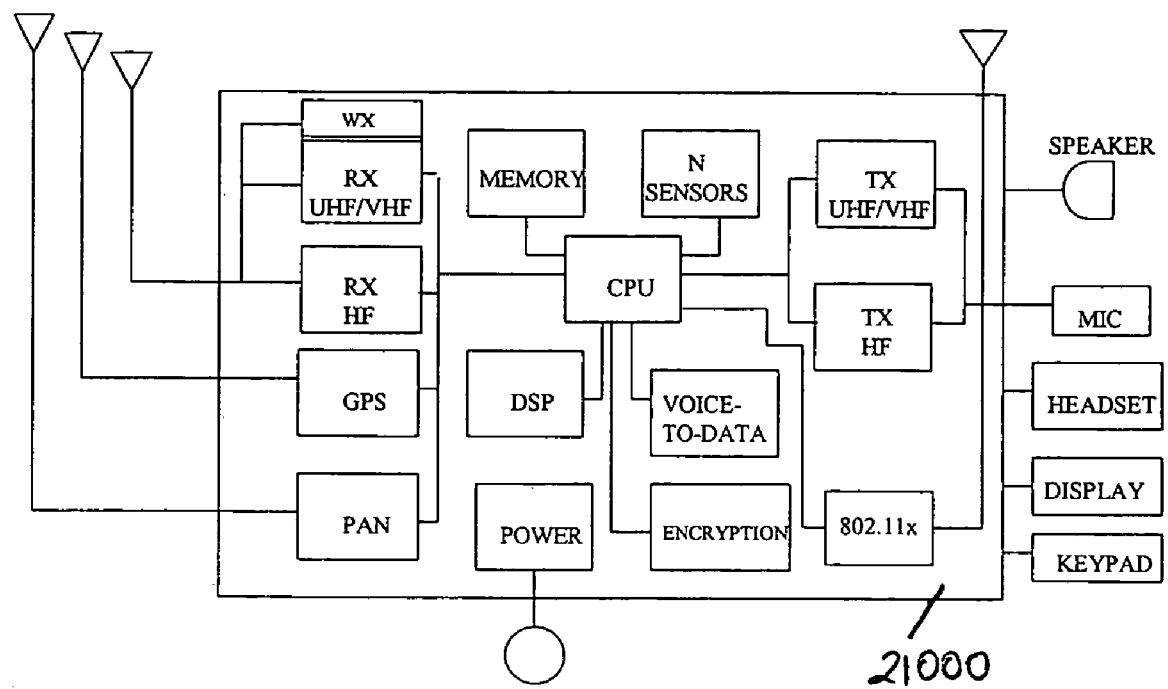
FIG. 6 is a block diagram of a first responder portable communication device, under the embodiment of FIG. 4.

Referring again to FIG. 4, the FRCS includes numerous field devices 20000, including responder radios 21000 and sensors 22000, as described above. The first responders will carry radio handsets as they typically do when responding to an incident; but in contrast to the typical responder radios currently in use, the first responder radios 21000 provided herein enable the responders to communicate across different functional units (i.e., fire to police, police to EMS, etc.) via common channels and frequencies. FIG. 6 is a block diagram of a first responder radio 21000, under the embodiment of FIG. 4.

The responder radios 21000 transfer numerous types of information. As such, the radios 21000 enable more control in situations where numerous personnel are engaged in activities that require their mutual and combined efforts, situations that include but are not limited to police actions involving criminal chases or searches, hostage situations, firefighter actions in burning structures, fighting forest fires with heavy smoke and wind, border search and control, rescue activities in fog or inclement weather, and emergency evacuation situations.

Each of these situations and the corresponding differing set of circumstances are supported by the responder radio 21000 of an embodiment using of a variety of different technologies in order to successfully accomplish the intended purpose. The responder radios 21000 support voice transmission and reception using a relatively short-range radio within a small incident area. The responder radios 21000 of an embodiment also support first responder position location using technologies including GPS. Further, where first responders are likely to be in locations where GPS accuracy degrades (for example, inside structures) and/or accurate position tracking is desired, the responder radios 21000 support position determination using one of several possible geolocation technologies including but not limited to enhanced GPS, differential GPS, MEMS accelerometers, dead reckoning, and RF identification/direction finder (RFID/DF) technology. The responder radios 21000 use a global unique identification number, such as a Media Access Control (MAC) address, for identification and display in the command console 11000 along with position information, but are not so limited.

The responder radio 21000 includes at least one processor or central processing unit (CPU) coupled among components including at least one of signal processing devices, memory devices, communication circuitry, transmitters, receivers, antennas, modems, network systems, position systems, and encryption devices. The processor of an embodiment includes a 32-bit processor. Additionally, the responder radio 21000 couples to any number of external devices known in the art for coupling to processor-based communication systems, including displays, microphones, speakers, headsets, keypads, joysticks, and other data entry devices.

The components of the responder radios support communication via any number of protocols and frequency bands known in the art. For example, the responder radio 21000 of an embodiment supports at least one of HF, VHF, UHF/microwave, cellular, satellite, Wireless Fidelity (Wi-Fi), and Bluetooth™ communications using both analog and digital protocols. The responder radio 21000 transmits and receives voice and data messages on common frequencies for all responders in order to provide an integrated response by all response agencies. The responder radio 21000 of an embodiment receives selective alerts via the National Weather Service channel link. Further, low power HF provides seamless backup of VHF/UHF communications using the ground wave. The responder radio 21000 also communicates via the transfer of packet data. The responder radio 21000 self-configures the communication channels to optimize data transmission, as appropriate. The responder radios 21000 can be addressed individually, as a group (multicast), or collectively as a whole (broadcast) from other responder radios 21000 and the command and control transceiver 13000. The responder radios 21000 are also capable of transmitting and receiving packet data communication in addition to voice.

As described above, the responder radios 21000 of an embodiment support first responder position location using a GPS receiver/locator. In certain scenarios where in-building structures cause loss of signal (LOS) to the GPS receiver/locator, then acoustic, magnetic, MEMS devices, and/or RF devices are used to pinpoint the geographical location of each responder from inside the structure and send the updated information to components of the command and control system 10000.

The network systems of the responder radio 21000 include a Personal Area Network (PAN) system that forms the backbone that links the various components of the FRCS and provides the management of the control functions. The PAN utilizes USB as its primary data transfer protocol, but is not so limited, thereby providing for peer-to-peer operation without a computer.

The responder radios 21000 of an embodiment use location-based multicast addressing, but are not so limited. This multicast group IP addressing scheme is used to map the individual positions of each responder radio within the incident scene to a corresponding virtual location on the wireless PAN using the IP address of the radio 21000. This mapping component enables the incident commander to view the location of each responder radio 21000 on a map display.

A unique 802.11x peer-to-peer self-configuring ad hoc wireless network with multi-hop routing of data packets enables the multicast addressing by automatically connecting each responder radio 21000 in the network to other responder radios 21000 and field devices 20000 and treating each device as a single network node, using UHF or higher bands (e.g., 902–2400) to make the connection. Each node or device 20000 is then assigned a unique global identifier (MAC) along with a personal identification (ID). Using this approach, routing tables are assembled at the command and control system 10000 and propagated back though the nodes (responder radios). Each responder is then recognized and tracked by the global identifier. The MAC ensures that not only the command and control packets sent by the portable system controller 12000 are differentiated, but more important, that differentiation is effective among the packets sent by all other field devices 20000 on the network as well.

The peer-to-peer self-configuring network is unique because the two basic MAC classes of service packets are modified to improve reliability and accuracy. The two basic classes of service supported by MAC are RES packets for routing control and messages, and BE packets for best effort MAC service. However, use of these classes of service often results in routing updates and maintenance packets that are delayed or lost, causing time-consuming routing updates and a slow network reporting. For this reason, the FRCS uses a modified MAC that makes all routing packets high quality priority packets, thus ensuring timely updates and a higher quality of data sharing between nodes. This modified MAC packet structure thus allows communication among all devices on the network with a higher degree of reliability and accuracy.

Priority signal routing on the network is controlled by the portable system controller 12000. The portable system controller keeps track of all responder and device activities, both data and voice, and performs an automated analysis using the sensor inputs.

Additional accessories of the FRCS can improve communications, thereby enhancing the self-configuring network in enclosed areas such as high-rise buildings, tunnels, and large complexes (shopping malls, power plants, and corporate campus areas). The accessories include, for example, leaky cable systems (which can be pre-installed), and field-deployable repeater terminals (the remote field deployable terminals contain sensors and communications repeater functions). Even in those instances where leaky cables are not available and remote field deployable terminals are not practical, the standard terminal functionality including HF, alternate channel communications, and self-configuring and voting receiver capabilities, enhance the FRCS beyond typical solutions.

As an example, a specification follows for the responder radio 21000, under the FRCS of an embodiment, but the responder radio 21000 is not limited to these parameters alone or in combination: Radio Handset Capability; Two way voice communications via amplitude modulation (AM) and/or frequency modulation (FM); Range up to five (5) miles outdoors/250,000 sq. ft. or 20 floors indoors; Operates on 30–512 MHz, HF/VHF/UHF frequencies in contiguous 5 and 6.25 kHz steps; Priority scan, 1 channel; Voice-activated, hands-free operation (VOX) capability; Transmit Output Power up to five (5) watts, user selectable; Audio up to 400 milliwatts (mw) depending on level setting; Designed to Mil-Spec 810 and IP54 Specifications; Interoperability capable; Multi-channel operation with (38 Analog and 83 Digital) Interference Eliminator Codes; three (3) Scramble Settings To Reduce Eavesdropping; Channel Scan With Selectable Scan List; Backlit keypad and interlock; three (3) Audible Call Tones; VOX sensitivity with three (3) level settings; Cloning Compatible (Multi-Unit Charger Required); Panic Button; Short message mode; Time of day clock with on/off timer; Weather Frequency monitoring, with alert capability; Supports Power Management Mode; Supports Differential GPS (RTCM Input); 7.5 Volt, 3000 mAH Rechargeable Lithium-Ion Battery; AM emergency tone beacon; Backup battery input for Real Time Clock; Drop-In Charger Compatible; Weight approximately 30.6 ounces (868 gm) with Lithium-Ion Battery; 6-Pin Multi function top connector; 10-Pin Multi function top connector; 18-Pin Multi function side accessory plug for extended upgrades; Backup Battery holder for 5 non-rechargeable AA batteries; Standard use Duty Cycle; Current 200 mA receive; 50 mA receive on power saver; Rapid 6-Hour Plug-In Charger; Radio Holster With three (3) inch Spring Clip; Diversity antennas 30–512 MHz; 802.11x wireless peer-to-peer self-configuring communications system.

As an example, a specification follows for the GPS locator, under the FRCS of an embodiment, but the GPS locator is not limited to these parameters alone or in combination: Passive or active antenna; High Performance 16 Channel Receiver; Differential Corrections supported; RTCM SC104 R2.1; Very Low Power; 52 mA at 3.3 volts direct current (VDC) full satellite tracking operation; Wide operating temperature range –40 C to +85 degrees Celsius; Receiver sensitivity –141 dbm; and WAAS capability.

The field devices 20000 also include sensors, as described above. The sensors provide data to the command and control system 10000 on various parameters including, but not limited to, environmental conditions, first responder biometric information like vitals, vehicle and other asset status, and situational developments. Each sensor uses a global unique identification number, such as a MAC address, for identification and display in the command console 11000.

The sensors are deployed in various forms and can be configured to transmit data based on differing rules. For example, sensors can be incorporated into the responder radios 21000 to monitor the immediate environment of the responder. Further, sensors can be carried in/on responder vehicles in order to monitor critical information around and related to the vehicle. Moreover, sensors can be attached to the responders and/or the responder's clothing/equipment to monitor the individual vitals. Additionally, groups of sensors can be deployed by other means throughout the engagement area to monitor the incident environment. All of the intelligent sensors are networked together in the mesh network regardless of whether they are carried on the responder or are otherwise deployed within or around the incident area.

The FRCS uses any number of sensors known in the art to measure a variety of parameters. Also, the sensor suite included in a responder radio 21000 can be tailored to particular responder activities (police, border control, safety, fire, forest fire, etc). As an example, the FRCS of an embodiment uses the following sensors: smoke (potential fire, danger); radiation (HAZMAT danger); moisture (environmental condition); biological agents (HAZMAT danger); flow meter (water flow in fire hoses, pumps, tunnels or similar areas subject to flooding); ambient temperature (potential fire, explosion, combustible area); responder body temperature (responder condition, physical problem, fear, danger); pressure (shockwave); proximity (movement, activity); responder pulse rate (responder vitals, physical condition, fear, danger); vibration/motion (senses vehicle movement, structure collapse); equipment status (vehicle condition); motion (vehicle movement, suspect movement); tachometer (vehicle condition); sound/frequency (gun shot, explosion, vehicle engine, movement); head position (field of vision, blind spot); gas/vapor (carbon monoxide); chemicals (hazardous materials (HAZMAT) danger); visibility/visible light level (environmental condition); camera (situational status, suspect tracking); frequency scanners (monitor suspect radio communications); light (environmental condition).

Figure 7:
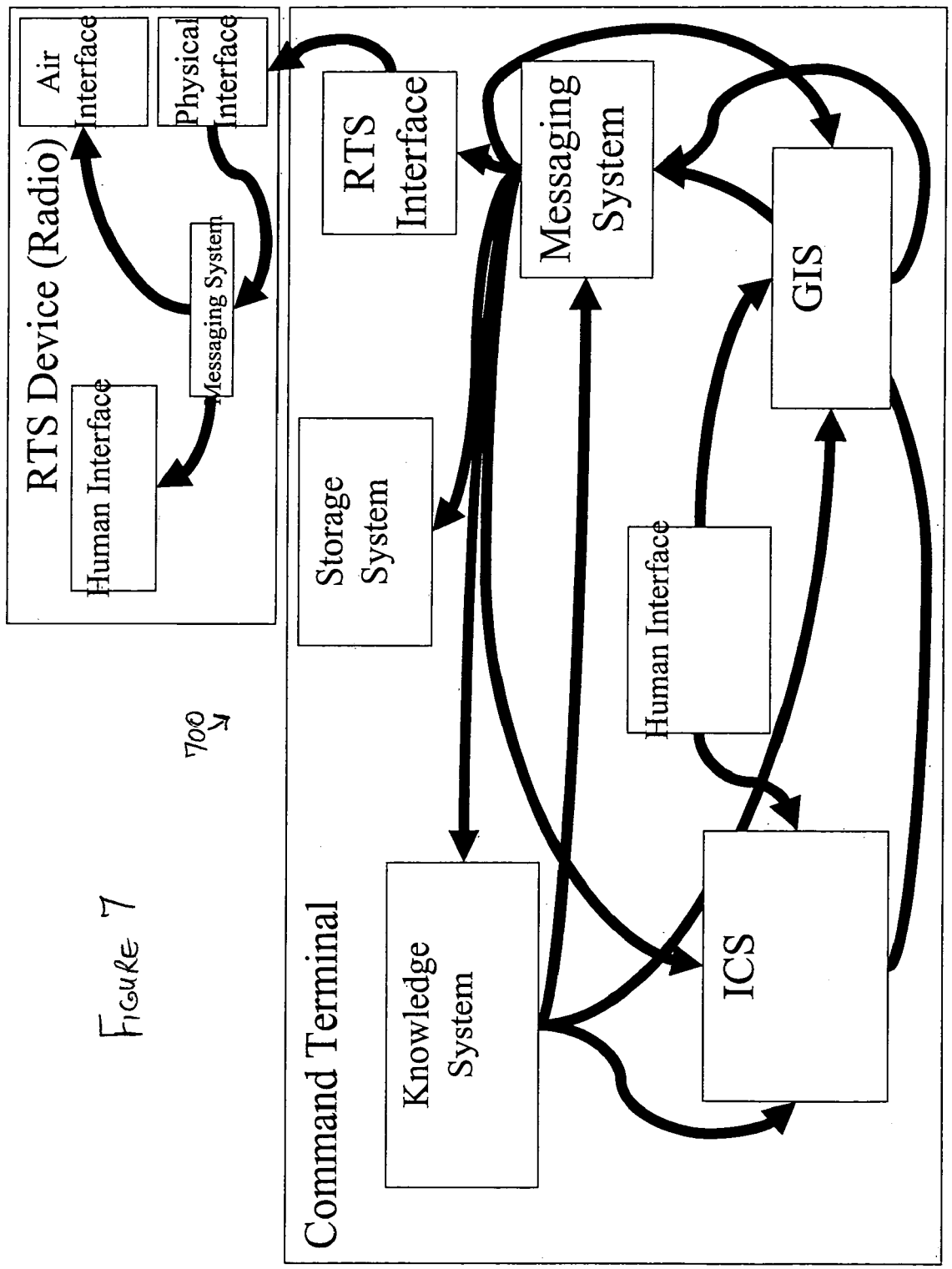
FIG. 7 is a block diagram showing the information flow from a portable command terminal to a first responder portable communication device, under the embodiment of FIG. 4.
Figure 8:
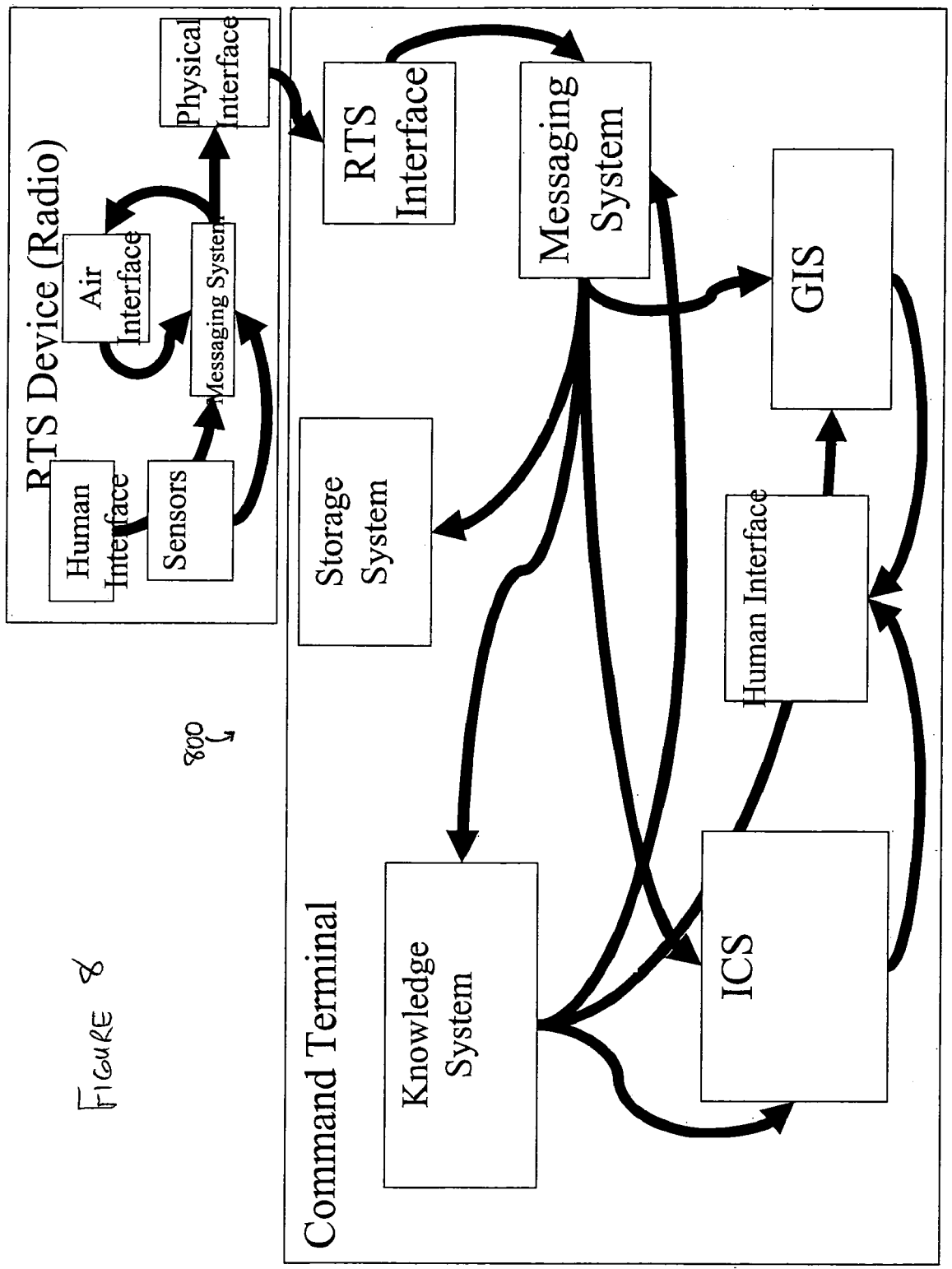
FIG. 8 is a block diagram showing the information flow from a first responder portable communication device to a portable command terminal, under the embodiment of FIG. 4.

FIG. 7 is a block diagram 700 showing the information flow from a portable command terminal 11000 to a first responder radio 21000, under the embodiment of FIG. 4. FIG. 8 is a block diagram 800 showing the information flow from a first responder radio 21000 to a portable command terminal 11000, under the embodiment of FIG. 4. Generally, the information flow includes the responder radios 21000 and/or field devices 20000 exchanging information with components of the command and control system 10000 using voice information, data (in the form of short messages), keystroke combinations, and geo-location information.

Figure 9:
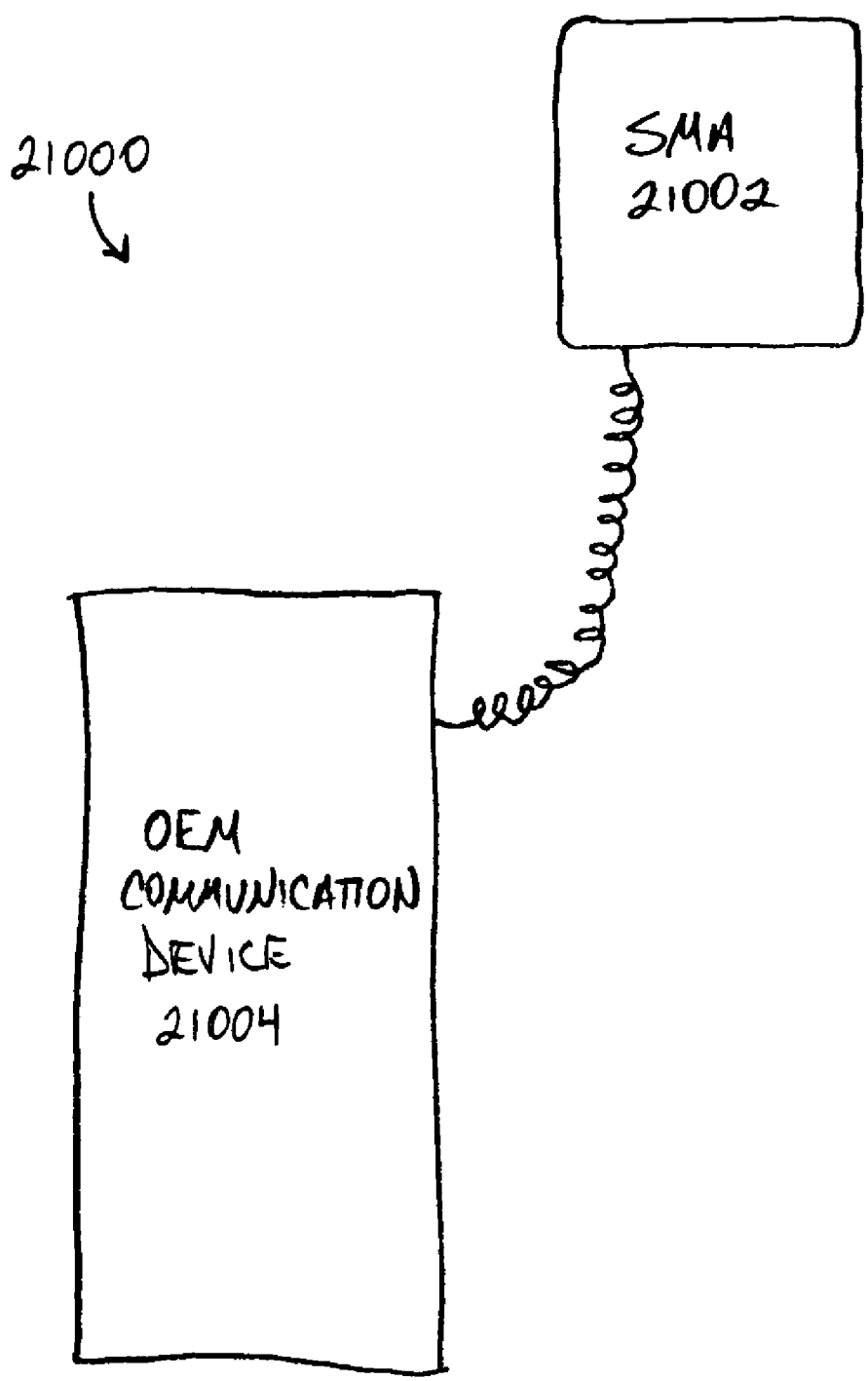
FIG. 9 is a Speaker-Microphone Accessory (SMA) coupled to an original equipment manufacturer (OEM) communication device to form a responder radio, under the embodiments described herein.

As described above, the field devices 20000 include responder radios 21000. The responder radios 21000 include any of a number of communication devices using any of a number of communication protocols and frequencies. In addition to the responder radios 21000 described above, the responder radios 21000 of an embodiment include a number of original equipment manufacturer (OEM) radios and communication devices equipped with a Geo-Location-Enabled Speaker-Microphone Accessory (SMA), also referred to as a Geo-Location-Enabled Speaker-Microphone-Radio-Network Accessory (SMA). FIG. 9 is an SMA 21002 coupled to an OEM communication device 21004 to form a responder radio 21000, under the embodiments described herein. The SMA 21002 replaces the existing speaker-microphone attachment on any OEM VHF/UHF portable radio 21004 or communication device with a version that integrates at least one of GPS capability, a unit ID, a radio module, a network chip and a timer. The combination of the SMA 21002 and the OEM radio 21004 provides the same functionality and capability provided by the responder radios 21000 described herein for use in the FRCS.

The SMA 21002 of an embodiment allows individuals or other resources to be accurately located by a central command and control entity using GPS technology, but without requiring the replacement of the user's existing portable radio(s). The SMA 21002 of an embodiment couples to the existing portable radio via an accessory jack of the radio like, for example, the built in speaker-microphone or other accessory jack. This strategy greatly reduces the cost of extending the automated location and dispatching technology to the pedestrian user. The coupling of the SMA to the communication radio does not interfere with or change the operation or functions of the communication radio. The responder can communicate with the standard radio to dispatch or other like responders on an assigned frequency, and can also communicate within the incident area on the incident frequency to the incident commander or any other responder within the incident area.

In operation, each transmission using the SMA 21002 broadcasts both the ID and GPS location information of the radio 21000 to the command and control console 10000 over the incident area network, as described above. The transmission can be initiated either manually by the user or automatically by an internal timer of the SMA 21002 on a periodic basis. The location and identification information is appended to the verbal message and transmitted via components of the OEM radio 21004, where the components include at least one of a transmitter, a transceiver, and a radio module, but are not so limited. In addition, the responder can communicate voice information via the radio module specifically to any responder in the area and all responders are linked together in a wireless network.

The responder radio 21000 transmits the GPS location information and identity information interleaved with all SMA 21002 transmissions, but is not so limited. On a regular timed interval basis, the GPS location information and the unit ID information is automatically transmitted by the SMA 21002 whether or not a manual transmission is initiated by the user of the radio 21000. In situations where GPS location information is not available, the RF data link between the SMA and other components of the FRCS is maintained so that the presence of the responder radio 21000 on the network is maintained thereby providing information to the Incident Commander as to the presence of the corresponding first responder at the incident scene.

Figure 10:
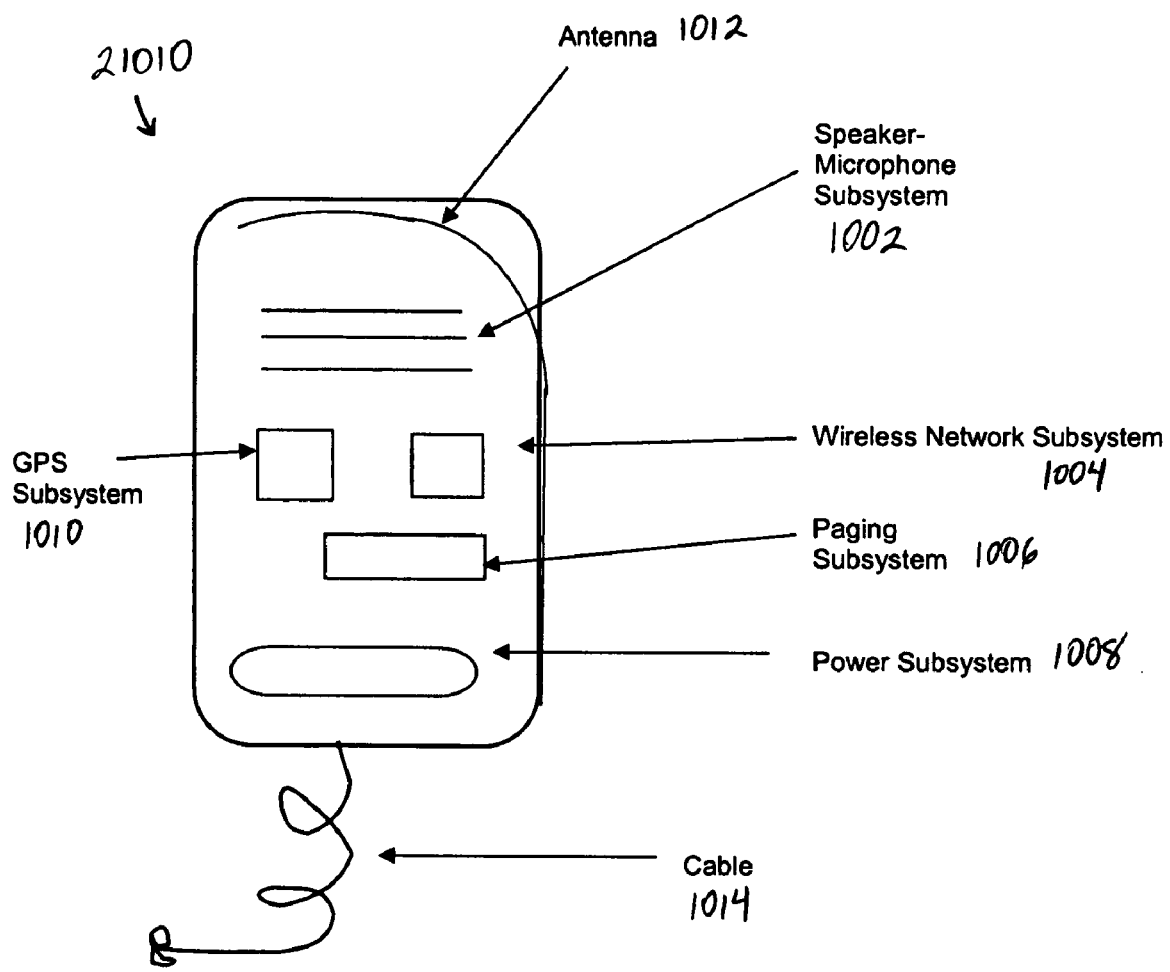
FIG. 10 is a block diagram of the SMA, under an embodiment.

FIG. 10 is a block diagram of the SMA 21010, under an embodiment. The SMA 21010 includes at least one of a speaker-microphone subsystem 1002, a wireless network subsystem 1004, a paging subsystem 1006, a power subsystem 1008 or power converter, a GPS subsystem 1010 and/or other location subsystem, and one or more antennas 1012 for use in communications via the wireless network and GPS subsystems, as described herein. The SMA 21010 can also include a number of other components (not shown), for example, a timer, an ID generator, an encoder, and components that parse the location and ID data to the voice stream and automatically transmit the parsed data. The SMA 21010 includes a cable 1014 for use in coupling components of the SMA 21010 to components of an OEM radio, but various alternative embodiments can wirelessly couple the SMA 21010 and the OEM radio without use of a cable 1014.

FIG. 11 is a block diagram of the SMA 21011, under an alternative embodiment. The SMA 21011 includes at least one of a speaker-microphone subsystem 1102, a wireless network subsystem 1104, a paging subsystem 1106, a power subsystem 1108 or power converter, a GPS subsystem 1110 and/or other location subsystem, and one or more antennas 1112 for use in communications via the wireless network and GPS subsystems, as described herein. The SMA 21011 can also include a number of other components (not shown), for example, a timer, an ID generator, an encoder, and components that parse the location and ID data to the voice stream and automatically transmit the parsed data. The SMA 21011 includes a cable 1114 for use in coupling components of the SMA 21011 to components of an OEM radio, but various alternative embodiments can wirelessly couple the SMA 21011 and the OEM radio without use of a cable 1114.

The SMA 21011 also includes a transceiver subsystem 1120 also referred to as a radio transceiver subsystem 1120 that uses a digital modulation technique (for example, Code Division Multiple Access (CDMA), Time Division Multiple Access (TDMA), etc.) on a frequency band appropriate to the short range incident area. The frequency band of an embodiment is in the super-high-frequency (SHF) band, or approximately in the range of frequencies including 3–30 GHz. As one example, the SMA 21011 includes a radio transceiver subsystem 1120 that communicates on a frequency of approximately 2.4 GHz. The frequency band of the radio transceiver subsystem 1120 of an alternative embodiment is in the public safety band, or approximately in the range of frequencies including 764–776 MHz and 794–806 MHz and using the standard Association of Public-safety Communications Officials (APCO) modulation standard for that band (APCO 25). The transceiver subsystem 1120 communicates with other portable units and with the on-scene command and control console within an incident area. These transmissions are activated by at least one of proximity, commands from the command and control console, and manual selection, but are not so limited.

The SMA 21011 of an embodiment also includes a two-way pager 1106 also referred to as a two-way pager subsystem 1106. The two-way pager 1106 uses soft keys activated by the existing page alert system in use by the user/responder and also by the on-scene incident command and control console. The soft keys and two-way functionality allow the user to respond with one of several pre-programmed messages to the command and control console via the pager message transmitter. The use of this two-way pager allows text messaging, two-way alerts and text acknowledgement independent of the separately available voice channel of the first responder radio 21000. The additional transceiver subsystem also provides on-scene secure communications for the incident responders and frees the existing VHF/UHF frequency for more traditional uses at the same time.

Information from the responder radios, upon receipt at the command and control system 10000, is provided to the keyword database, as described above. A lookup is run for ten-codes and other custom or unique codes and/or code combinations. Sensor data is also provided to the keyword database and compared against sensor codes or values and sensor combinations pre-populated into the database. The results of comparisons run in the keyword database are provided to the scenario database where they are compared to predetermined responses, command scenarios, triangulation scenarios, information of the Incident Control System, and Emergency Management Resources. Both the keyword database and the scenario database are updated by downloading information for each engagement type from existing or new systems, where the information includes standard operating procedures, checklists, and the Incident Control System, for example.

The keyword database/system uses a responder-/user-specific set of keywords in conjunction with both user identification (ID) and sensor inputs to generate a "short message" that triggers a look-up table at the portable command terminal. The look-up table includes information of appropriate responses and actions. The keyword database/system recognizes a set of pre-established command scenarios that include possible responses to an incident and provides corresponding control inputs to the commander in charge to assist in decision making. The combination of responder/user inputs identifies both the user and the type of action requested. The keyword system responds with a coded reply in the form of a display or synthesized voice to acknowledge understanding of the action requested. The specific set of keywords and look-up table responses are unique to both the type of user (police, firefighter, emergency, safety, etc.) and the particular situation (search, structure fire, forest fire, aircraft crash, etc.). The terminal operator downloads a look-up table and the specific keywords to be recognized for the type of engagement and user at the beginning of each engagement. When a responder radio issues a keyword (along with the other inputs) the keyword automatically generates a block of requests or actions to the console operator and a specific icon on the command terminal associated with the handset user's ID for quick identification and response. The terminal operator sends an acknowledgement in the form of a keyword to the user of the action taken. Keywords also integrate ten-codes, or aural brevity codes, with other pertinent sensor data to convey more detailed information about a given situation or condition. The ten-codes of an embodiment include the official ten-codes of APCO, as well as any local or unit-specific codes, but are not so limited.

The command terminal analyzes and combines keyword inputs from multiple responder radios at the incident site to better understand the situation and to direct appropriate action. The command terminal operator can broadcast keyword responses to multiple or individual responder radios as required. Keywords issued at a responder radio can also be relayed through the command terminal, resulting in the issuance of verbal commands to other responder radios at the incident site.

The scenario database subsequently or simultaneously provides data to the command console. The command console displays the responder activities and all other information related to the engagement on a display, for example a GUI. A history is generated from the sensor inputs, the scenario database, and the responder and engagement activities to provide predictive as well as recommended courses of action to the commander via pop-up displays. The actions taken via the command console could be in response to an action request, or a command activity to prevent or react to a situation. These actions can be manual or automated (with the capability to modify or override by the commander), voice or data, and transmitted to an individual, group of individuals (multicast), or broadcast to all the responders collectively.

The engagement history, all action requests and responses, commands and sensor inputs are stored locally in the local database 17000 for use in generating post-incident reports and analysis. Other storage devices/locations external to the command and control system 10000 can also be used for redundancy and survivability. The analysis results can be used for responder training, training products or simulators, and for inclusion into the keyword database and the scenario database.

The command and control system 10000 of an embodiment, as described above, uses automatic pop-up messages/graphics and predictive alert messages to provide information of the incident. Further, numerous checklists can be displayed via displayed menus in order to help the incident commander ensure that no checklist items are skipped during an incident. The command and control system 10000 supports use of checklists consistent with, for example, the California Fire Services Field Operations Guide (ICS 420-1), but is not so limited. The various graphics and messages provided by the command and control system 10000 provide the incident commander with the steps necessary to react to emergencies.

Examples follow of checklists and checklist items that are available via displayed menus of the command and control system 10000, for example drop-down menus to the Incident Commander. The command and control system 10000 includes, but is not limited to: checklists of common responsibilities for ICS personnel; unit leader responsibilities; Multi-Agency Coordination System (MACS) checklists, including responsibilities of the MACS Group Coordinator; Area Command Position Checklists including checklists for the Area Commander, the Assistant Area Commander Planning, the Assistant Area Commander Logistics, and the Area Command Aviation Coordinator; Command Position Checklists including checklists for the Incident Commander, the Information Officer, the Liaison Officer, the Agency Representative, and the Safety Officer; Operations Position Checklists including checklists for the Operations Section Chief, the Branch Director, the Division/Group Supervisor, the Strike Team Task Force Leader, the Single Resource, the Staging Area Manager, the Air Operations Branch Director, the Air Tactical Group Supervisor, the Helicopter Coordinator, the Air Tanker/Fixed Wing Coordinator, the Air Support Group Supervisor, the Helicopter Base Manager, the Helicopter Landing Spot Manager, the Mixmaster, the Deck Coordinator, the Loadmaster, the Parking Tender, the Take-off and Landing Controller, the Helicopter Base Radio Operator, and the Helicopter Timekeeper; and Planning Position Checklists including checklists for the Planning Section Chief, the Planning Process, the Resources Unit Leader, the Check-In/Status Recorder, the Situation Unit Leader, the Display Processor, the Field Observer, the Weather Observer, the Documentation Unit Leader, and the Demobilization Unit Leader.

Continuing with examples of checklists and checklist items that are available via displayed menus of the command and control system 10000, the command and control system 10000 also includes, but is not limited to: Logistics Position Checklists including checklists for the Logistics Section Chief, the Service Branch Director, the Communications Unit Leader, the Incident Dispatcher, and the Fireline Emergency Medical Technician; Hazardous Materials Position Checklists including checklists for the Hazardous Materials Group Supervisor, the Entry Leader, the Decontamination Leader, the Site Access Control Leader, the Assistant Safety Officer-Hazardous Materials, the Technical Specialist-Hazardous Materials, and the Safe Refuge Area Manager; Multi-Casualty Position Checklists including checklists for the Multi-Casualty Branch Director, the Medical Group/Division Supervisor, the Triage Unit Leader, the Treatment Unit Leader, the Air/Ground Ambulance Coordinator; and High Rise Structure Fire Position Checklists including checklists for the Base Manager, the Ground Support Unit Leader, the Lobby Control Unit Leader, the Systems Control Unit Leader, the Staging Area Manager, the Medical Unit Leader, and the Safety Officer.

The predictive alert capability allows the incident commander to track firefighters until they enter a building, and then provides a clock depiction of how long the firefighter remains in the building, based upon the oxygen in his tank upon entry. As the firefighter's oxygen is depleted an alert will flash, indicating that it is time for the firefighter to leave the scene and go to the rehabilitation area.

Predictive alerts are also presented to the incident commander from information of the sensors that are in use at the incident scene. Numerous sensors can provide information that supports the display of alerts to the incident commander including, but not limited to: smoke, moisture, pressure, temperature, proximity, vibration, motion, sound, gas, chemicals, radiation, biological, flow meter, pulse rate, run status, tachometer, head position, external source, video, camera, scanner, visibility, and light.

The FRCS of an embodiment provides the functions described above using at least one processor running under control of one or more algorithms, programs, or routines. In particular, and with reference to FIGS. 2, 4, and 5, the algorithms include algorithms controlling the messaging controller or system 16000, the storage or database system 17000, the knowledge system that includes the keyword database or system 14000 and the command scenario database or system 15000, and the user interface, as described in the Related Applications.

The messaging system of the FRCS generally includes at least one message router and at least one message parser, as described above, and with reference to FIGS. 2, 4, and 5, and in the Related Applications. Regarding the message router, all information flows throughout the systems and components of the FRCS in the form of messages. Each component/system of the FRCS is aware of every other component/system and knows the best route path for each message type to reach its target. Each message received is copied to each other component/system in the listen-to list or publish-to list. In addition, each message is forwarded to the message parser. Further, the message router keeps a log of each message, to the limit of available memory, and makes a decision for each message received if it has already been handled, and if so, dropped from the cue to prevent further processing. The message parser, upon receipt of a message, forwards a copy of the message to each of the other major software systems, storage, knowledge, GIS, ICS.

The storage system of the FRCS, as described above, and with reference to FIGS. 2, 4, and 5, and in the Related Applications, keeps a copy in local storage of each message received by the components/systems of the FRCS. Upon startup, the storage system requests updated information meeting the scenario, range and time specifications. The storage system is capable of replying to an update request message of a requester or requesting device by returning all message traffic within the scenario, range, and time specification of the requester.

The knowledge system of the FRCS generally includes at least one self-configuring command and control system, at least one voice-to-text/text-to-voice (TTV/VTT) system, at least one pattern recognition system, and at least one text recognition system, as described above, and with reference to FIGS. 2, 4, and 5, and in the Related Applications. The command and control system includes at least one database that allows an operator to specify the command priority of each device and, in the absence of an operator, determines the command priority based on preexisting data. The command and control system further includes a user interface that is provided in the ICS system. As devices are added and removed from the network, the CNC system automatically changes the command priority of active devices.

The TTV/VTT system of an embodiment receives each message or a copy of each message routed to the knowledge system. The TTV/VTT system updates received messages by appending either the audio version of the message or the text version of the message to the message, as appropriate. After the message is updated, it is passed back to the message parser.

The pattern recognition system also receives each message or a copy of each message routed through the FRCS system and performs at least one comparison on the received messages. When the comparisons result in a match, the knowledge system generates a new message with the additional information and passes this message back to the message parser.

Likewise, the text recognition system or filter receives each message or a copy of each message routed through the FRCS system and performs at least one comparison on the received messages. When the comparisons result in a match, the knowledge system generates a new message with the additional information and passes this message back to the message parser.

The user interface system of the FRCS generally includes at least one physical interface, at least one audio interface, and at least one visual interface, as described above, and with reference to FIGS. 2, 4, and 5, and in the Related Applications. Each of the physical, audio, and visual interfaces receives a copy of each message routed through the FRCS system. The physical interface includes keyboard, mouse, and vibrator components, but is not so limited. The audio interface includes microphone and speaker components, but is not so limited.

The visual interface of an embodiment includes visual indicators like LEDs and strobe lights in addition to the GIS system and ICS system. The visual interface manages and controls the on/off state as well as the intensity of the visual indicators in response to messages received by the visual interface.

The GIS system includes a map of GIS and facilities data along with the capability to display environmental information and unit information. The map can display GIS and facilities information and, further, can provide a sand table to enable the user to manually add facilities information. The sand table supports an operator selecting various templates of facilities information and adding these to the map.

The GIS displays include static geographical information including but not limited to mountains, streams, and trees. The facilities displays include static geographical information like buildings, roads, bridges, for example.

The display of environmental information includes the display of non-unit specific sensor information. Examples include a heat log where multiple location specific temperature readings are combined into a histogram of area temperature information.

The display of unit information includes the ability to display information of multiple units. Each unit includes an avatar to display physical information and a breadcrumb trail to display history of location. The avatar includes an avatar object along with various sensor display outputs, as appropriate. The avatar object is an icon used to identify the unit and includes color, shape, and size information to depict other information of the unit. Each display of unit-specific sensor data is represented with a graphical object. The bread crumb trail provides a visual track of the physical locations of a unit.

The ICS system includes at least one task tracker and at least one asset tracker, but is not so limited. Depending on the message received by the ICS, indicators and pop-ups are provided as a visual alerting or notification tool for the incident commander or operator to quickly know the particulars of a situation or event.

The task tracker includes a library of action items and information made available to the operator. A table of contents provides convenient access to the library by providing an index for the operator to find the information for which he/she is looking.

For each task there is a list of information organized in a task list that is made available to the operator. The task list can provide the ability for the operator to enter data, but is not so limited. When data is entered into the task list by the operator, the entered data is transferred to the messaging system for disposition by the appropriate responder or incident commander.

The asset tracker includes an asset list that supports operator viewing/modifying of detailed information relating to the assets, where each asset corresponds to a unit in the GIS. The operator has the ability to specify the command priority of each asset.

Aspects of the SMA may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the SMA include: microcontrollers with memory (such as electronically erasable programmable read only memory (EEPROM)), embedded microprocessors, firmware, software, etc. If aspects of the SMA are embodied as software at least one stage during manufacturing (e.g. before being embedded in firmware or in a PLD), the software may be carried by any computer readable medium, such as magnetically- or optically-readable disks (fixed or floppy), modulated on a carrier signal or otherwise transmitted, etc.

Furthermore, aspects of the SMA may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used herein refer to this application as a whole and do not refer to any particular portion of this application. When the word "or" is used in reference to a list of two or more items, that word covers all of the following interpretations of the word: any of the items in the list, all of the items in the list and any combination of the items in the list.

The above descriptions of embodiments of the SMA are not intended to be exhaustive or to limit the invention to the precise forms disclosed. While specific embodiments of, and examples for, the SMA are described herein for illustrative purposes, various equivalent modifications are possible within the scope of the SMA, as those skilled in the relevant art will recognize. The teachings of the SMA provided herein can be applied to other processing systems and communications systems, not only for the systems described above.

The elements and acts of the various embodiments described above can be combined to provide further embodiments. These and other changes can be made to the SMA in light of the above detailed description.

All of the above references and United States patent applications are incorporated herein by reference. Aspects of the SMA can be modified, if necessary, to employ the systems, functions and concepts of the various patents and applications described above to provide yet further embodiments of the SMA.

In general, in the following claims, the terms used are not to be construed as limiting the SMA to the specific embodiments disclosed in the specification and the claims, but should be construed to include all systems that operate under the claims to provide first responder communication and location systems. Accordingly, the SMA is not limited by the disclosure, but instead the scope of the SMA is to be determined entirely by the claims.

While certain aspects of the SMA are presented below in certain claim forms, the inventors contemplate the various aspects of the SMA in any number of claim forms. For example, while only one aspect of the SMA is recited as embodied in a computer-readable medium, other aspects may likewise be embodied in a computer-readable medium. Accordingly, the inventors reserve the right to add additional claims after filing the application to pursue such additional claim forms for other aspects of the SMA.

What we claim is:

1. A communication accessory device for use with a portable communication device, comprising:
   a network system that automatically assembles a wireless network among other portable communication devices and control devices in an area and automatically assigns a unique identification number to each portable communication device;
   at least one communication system that receives and transmits voice and data communications over the wireless network using at least one of High Frequency (HF) communications, Very High Frequency (VHF) communications, Super High Frequency (SHF) communications, Ultra High Frequency (UHF)/microwave communications, public safety band communications, cellular communications, satellite communications, and Public Switched Telephone Network (PSTN) communications;
   a positioning system that automatically and periodically determines a position of the device and automatically transfers the position to at least one of the control devices via the wireless network; and
   wherein the communication accessory device forms at least one coupling with the portable communication device.

2. The device of claim 1, further comprising at least one of a speaker system, a microphone system, and a speaker-microphone system.

3. The device of claim 1, wherein the portable communication device includes at least one of a portable two-way radio, a portable two-way pager, a cellular telephone, and a portable processor-based communication device.

4. The device of claim 1, wherein the at least one coupling with the portable communication device includes at least one of a wired coupling, a wireless coupling, and a hybrid wired/wireless coupling.

5. The device of claim 1, wherein the at least one communication system includes at least one transceiver system for use in a short-range incident area.

6. The device of claim 1, wherein the at least one communication system includes at least one two-way pager system for communications that are independent of communications of the coupled portable communication device, wherein the pager system provides at least one pre-programmed response to a user for use in responding to received messages, wherein the pre-programed responses are reprogrammable.

7. The device of claim 1, wherein the positioning system includes at least one of a Global Positioning System (GPS), a Radio Frequency Identification/Direction Finding (RFID/DF) system, an accelerometer-based system, a dead reckoning system, an infrared (IR) system, an acoustic system, a triangulation system, and a signaling system.

8. A communications system, comprising:
   a plurality of mobile communication devices;
   a communication accessory device coupled to the mobile communication devices, the accessory device including a network subsystem and a positioning subsystem, the network subsystem automatically assembling a wireless network among the mobile communication devices for information transfer and automatically assigning at least one unique identification number to each mobile communication device, the positioning subsystem automatically generating position information of each mobile communication device; and
   at least one control system coupled for information transfer with the plurality of mobile communication devices, the control system tracking and mapping individual positions of each mobile communication device using the position information and identifying each mobile communication device on the map using the identification number.

9. The system of claim 8, wherein communications among the mobile communication devices and the control system occur using at least one of High Frequency (HF) communications, Very High Frequency (VHF) communications, Super High Frequency (SHF) communications, Ultra High Frequency (UHF)/microwave communications, public safety band communications, cellular communications, satellite communications, and Public Switched Telephone Network (PSTN) communications.

10. The system of claim 8, wherein the positioning subsystem includes at least one of a Global Positioning System (GPS), a Radio Frequency Identification/Direction Finding (RFID/DF) system, an accelerometer-based system, a dead reckoning system, an infrared (IR) system, an acoustic system, a triangulation system, and a signaling system.

11. The system of claim 8, wherein the information transfer includes voice information and data.

12. The system of claim 8, wherein the identification number is a media access control (MAC) address, wherein the MAC address is associated with routing packets having modified priorities, wherein the routing packets are high quality packets that provide reliable communication between the plurality of mobile communication devices and the control system.

13. The system of claim 8, wherein the control system further comprises a graphical user interface (GUI) that displays the individual positions of each mobile communication device on a three-dimensional map.

14. The system of claim 8, wherein the identification number is a media access control (MAC) address, wherein location-based multicast group Internet Protocol (IP) addressing is used to map the individual positions of each mobile communication device within an incident scene.

15. A method for automatically tracking and communicating among mobile communication devices, comprising:
coupling a communication accessory device to each of a plurality of mobile communication devices and automatically assembling a wireless network among the mobile devices and control systems in an area using at least one component of the communication accessory device, wherein assembling includes adding mobile devices and control systems to the wireless network as they arrive in the area and removing mobile devices and control systems from the wireless network as they depart the area;
receiving voice and data communications from each of the mobile devices of the wireless network, wherein the data communications include position and identification information of each mobile device of the wireless network;
tracking a position and status of a mobile device using the position and identification information; and
generating a map of an engagement and displaying individual positions, tracks, and identifications of each mobile device of the wireless network using the position and identification information.

16. The method of claim 15, further comprising:
comparing information of the voice and data communications with historical scenario and response information;
generating predictions of engagement progress using results of the comparison;
displaying the predictions on the trap; and
updating the historical scenario and response information to include at least one of the information of the voice and data communications and the generated predictions.

17. The method of claim 15, further comprising:
comparing information of the voice and data communications with historical scenario and response information;
generating recommended courses of action using results of the comparison;
displaying the recommended courses of action on the map; and
updating the historical scenario and response information to include at least one of the information of the voice and data communications and the generated recommended courses of action.

18. The method of claim 15, wherein tracking a position and status further comprises:
generating a historical position trace for each of the mobile devices; and
displaying the position trace on the map.

19. The method of claim 15, further comprising receiving sensor data from at least one sensor of at least one mobile device.

20. The method of claim 19, further comprising:
comparing the sensor data with historical scenario and response information;
generating predictions of engagement progress using results of the comparison;
displaying the predictions on the map;
providing indications on the display to indicate at least one of critical conditions and critical situations;
updating the historical scenario and response information to include at least one of the sensor data and the generated predictions; and
generating recommended courses of action using at least one of the results of the comparison and the predictions.

* * * * *